(12) United States Patent
Chen

(10) Patent No.: US 9,088,925 B1
(45) Date of Patent: Jul. 21, 2015

(54) METHOD AND SYSTEM FOR FACILITATING HANDOFF OF A UE TO AN EARLIER SERVING WIRELESS NETWORK

(71) Applicant: Sprint Spectrum L.P., Overland Park, KS (US)

(72) Inventor: Bonnie Chen, Grapevine, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 425 days.

(21) Appl. No.: 13/630,779

(22) Filed: Sep. 28, 2012

(51) Int. Cl.
*H04W 36/12* (2009.01)
*H04W 36/24* (2009.01)

(52) U.S. Cl.
CPC .............. *H04W 36/24* (2013.01); *H04W 36/12* (2013.01)

(58) Field of Classification Search
CPC ....... H04W 88/06; H04W 4/16; H04W 80/04; H04W 36/0022; H04W 36/0033; H04W 36/08; H04W 36/34; H04W 36/12; H04W 36/24

USPC .......................................... 370/331; 455/436
See application file for complete search history.

(56) References Cited

U.S. PATENT DOCUMENTS

| | | | |
|---|---|---|---|
| 2005/0073990 A1* | 4/2005 | Chang et al. ................... | 370/349 |
| 2006/0046724 A1* | 3/2006 | Ton et al. ....................... | 455/442 |
| 2009/0086672 A1* | 4/2009 | Gholmieh et al. ............. | 370/329 |
| 2009/0092093 A1* | 4/2009 | Wu et al. ....................... | 370/331 |
| 2012/0327854 A1* | 12/2012 | Kawakita ....................... | 370/328 |

* cited by examiner

*Primary Examiner* — Dinh P Nguyen

(57) ABSTRACT

A method and system to facilitate handoff of user equipment (UE) back to the same wireless network that was earlier serving the UE. When the UE is being served by a first wireless network and is going to be handed off to a second wireless network, the second wireless network may receive and store an identifier of the first wireless network. In turn, when the UE is going to hand off from the second wireless network (e.g., due to low signal strength or preference for another air interface protocol), the second wireless network may then transmit the identifier of the first wireless network to the UE, to cause the UE hand off back to the first wireless network rather than to some other network.

20 Claims, 5 Drawing Sheets

METHOD AND SYSTEM FOR FACILITATING HANDOFF OF A UE TO AN EARLIER SERVING WIRELESS NETWORK

BACKGROUND

Unless otherwise indicated herein, the materials described in this section are not prior art to the claims and are not admitted to be prior art by inclusion in this section.

A typical cellular wireless system includes a number of base stations that radiate to define wireless coverage areas, such as cells and cell sectors, in which user equipment devices (UEs), such as cell phones, tablet computers, tracking devices, embedded wireless modules, and other wirelessly equipped communication devices, can operate. In turn, each base station is typically coupled with equipment that provides connectivity with one or more transport networks, such as the public switched telephone network (PSTN) and/or the Internet for instance. With this arrangement, a UE operating within a coverage area of any base station can engage in air interface communication with the base station and can thereby communicate via the base station with various remote network entities or with other UEs served by the base station.

In general, a cellular wireless system may be provided by a public land mobile network (PLMN) service provider and may operate in accordance with a particular air interface protocol or "radio access technology," with communications from the base stations to UEs defining a "forward link" (or downlink) and communications from the UEs to the base stations defining a "reverse link" (or uplink). Examples of existing air interface protocols include CDMA (e.g., 1xRTT and 1xEV-DO), LTE, WiMAX, iDEN, TDMA, AMPS, GSM, GPRS, UMTS, EDGE, MMDS, WI-FI, and BLUETOOTH. Each protocol may define its own procedures for initiation of calls, handoff between coverage areas, and functions related to air interface communication.

Further, air interface communications in each coverage area of a cellular wireless system may be encoded or carried in a manner that distinguishes the communications in that coverage area from communications in adjacent coverage areas. For example, in a CDMA system, each coverage area has a respective pseudo-random noise offset or "PN offset" that is used to encode or modulate air interface communications in the coverage area distinctly from those in adjacent coverage areas. And in an LTE system, each coverage area has a respective identifier ("cell ID" or "sector ID") that is broadcast in a synchronization signal to distinguish the coverage area from adjacent coverage areas. Analogously, in other air interface protocols, communications in one sector may be distinguished from those in other sectors by frequency, time, and/or various other parameters.

To enable a UE to select an appropriate coverage area in which to operate, the base stations in a cellular wireless system may be arranged to broadcast in each of their coverage areas a respective pilot signal (or "reference signal"). Further, the cellular wireless system may have a particular network identifier, such as a PLMN ID or a carrier frequency on which the system operates, and the base stations in the system may broadcast their pilot signals using that identifier or may separately broadcast an indication of the network identifier (e.g., in an overhead message such as an LTE "master information block" for instance). In practice, a UE may then scan for and evaluate the strength of any detected the pilot signals, possibly preferring signals from a particular cellular wireless system for instance, and the UE may then seek to operate in the coverage area broadcasting the strongest pilot signal. For instance, the UE may transmit on a reverse link control channel in that coverage area a registration request or attach request, and the serving base station and associated equipment may process the registration and transmit on a forward link control channel a registration acknowledgement message. Further, once initially registered in a coverage area, a UE may continue to monitor the pilot signal of that coverage area as well as the pilot signals of adjacent coverage areas, to help ensure that the UE continues to operate in the coverage area providing the strongest coverage.

To initiate a call (e.g., voice call, data session, or other type of call) when operating in a coverage area, a UE may transmit on a reverse link access channel of the coverage area an origination request or the like, requesting the serving base station to allocate resources for the call. The base station may then reserve resources for the call and transmit on a forward link control channel a directive for the UE to proceed with the communication using particular air interface resources (such as a particular air interface traffic channel, timeslots, or resource blocks). Likewise, if the base station or associated equipment receives a request to connect a call to the UE, the base station may transmit on a forward link control channel a page message for the UE, and the UE may receive and respond to that page message to facilitate setup of the call.

During an ongoing call in a coverage area, the UE may also continue to monitor the pilot signal of that coverage area and the pilot signals of adjacent coverage areas. For instance, the UE may regularly measure signal strength from its serving coverage area and from adjacent coverage areas and may regularly report the signal strength level(s) in radio measurement reports to its serving base station. If appropriate, the base station or associated equipment may then arrange for handoff of the UE to another coverage area. For instance, if the UE reports a sufficiently stronger signal from an adjacent coverage area, the base station or associated equipment may arrange for transfer of the call to the adjacent coverage area and may send a handoff direction message to the UE, instructing the UE to continue the call in the adjacent coverage area.

Furthermore, in some cases, more than one air interface protocol might be implemented in a given market area. For example, a given market area might provide both 3G (e.g., CDMA 1xRTT and 1xEVDO) coverage under and also 4G (e.g., LTE or WiMAX) coverage. In a system that provides two or more air interface protocols in a single area, a UE might not only hand off between coverage areas under a common air interface protocol (e.g., between 3G CDMA coverage areas) but may also hand off between the different air interface protocols (e.g., between 3G CDMA coverage and 4G LTE coverage) within a given physical location or when moving between locations. Handoff between different air interface protocols is known as "vertical" handoff.

Vertical handoff may be appropriate in a scenario where a UE is operating under one air interface protocol and reaches a point where that air interface protocol does not provide adequate coverage. In that scenario, the UE may begin scanning for coverage of another air interface protocol (e.g., autonomously or at the direction of its serving network), and upon finding such other coverage may work with the serving network and/or the new network to orchestrate a handoff. Further, vertical handoff may be appropriate in a scenario where a UE is programmed to prefer one air interface protocol over another. In that case, when the UE is operating under the less preferred protocol, the UE may from periodically scan for coverage of the other protocol, and if the UE detects such coverage, the UE may then work with the serving network or the new network to orchestrate a handoff.

OVERVIEW

In general, a UE that is capable of operating under various different air interface protocols may provide on its user interface an indication of which protocol it is currently using at any given time. Such an indication may advantageously allow a user of the UE to know what quality of service (e.g., data speed, reliability, etc.) to expect. For example, the user may come to expect that when the UE is operating in "3G" coverage, the device may have a certain quality of service, and when the UE is operating in "4G" coverage, the UE may have an improved quality of service.

A problem can arise, however, in a scenario where more than one type of a given air interface protocol is implemented in the same market area. For instance, there could be a scenario where two different wireless service providers both operate "4G" networks in the same market area, but where the two 4G networks provide substantially different quality of service than each other. By way of example, both 4G networks might be 4G LTE networks, but one network might operate on a more reliable carrier frequency or might have superior network infrastructure that supports higher data speeds. And as another example, one 4G network might be a 4G LTE network and the other 4G network might be a 4G WiMAX network, and LTE might provide better performance than WiMAX. In either such scenario, a UE that is being served by a given one of those 4G networks might hand off to a 3G network and might then hand off to the other 4G network rather than back to the same 4G network that earlier served the UE. As a result, although the device may indicate to the user that it has returned to 4G coverage, the user may experience quite a different quality of service than the user experienced the last time the UE was in 4G coverage. This disparity in quality of service could be disconcerting for the user.

In an effort to help manage user expectations, disclosed herein is a method and corresponding system arranged to facilitate handoff of a UE back to the same wireless network that was earlier serving the UE. In an exemplary implementation of the method, when the UE is being served by a first wireless network and is going to be handed off to a second wireless network, the second wireless network may receive and store an identifier of the first wireless network. In turn, when the UE is going to hand off from the second wireless network (e.g., due to low signal strength or preference for another air interface protocol), the second wireless network may then transmit the identifier of the first wireless network to the UE, to cause the UE to scan for and hand off back to the first wireless network rather than to some other network.

More particularly, in one respect, the method may involve, during handoff of a UE from a first wireless network to a second wireless network, receiving into the second wireless network from the first wireless network an identifier of the first wireless network, and storing the received identifier in data storage of the second wireless network. Further, the method may involve, while the UE is thereafter being served by the second wireless network as a result of the handoff of the UE from the first wireless network to the second wireless network, detecting a trigger for handoff of the UE from the second wireless network and, responsive to detecting the trigger, (i) retrieving the stored identifier from the data storage and (ii) wirelessly transmitting the retrieved identifier from the second wireless network to the UE in a directive for the UE to handoff back to the first wireless network.

In another respect, the method may involve, while a UE is being served by a first wireless network, (i) receiving into a second wireless network that is not currently serving the UE an identifier of the first wireless network and (ii) the second wireless network storing the received identifier of the first wireless network. In turn, the method may involve the second wireless network serving the UE as a result of handoff of the UE from being served by the first wireless network to being served by the second wireless network. And the method may then involve, while the second wireless network is serving the UE as a result of the handoff, the second wireless network detecting a trigger for handing off the UE from the second wireless network and, responsive to detecting the trigger, the second wireless network (i) retrieving the stored identifier of the first wireless network and (ii) transmitting the retrieved identifier to the UE.

Further, a representative system may include a network communication interface, a processing unit, data storage, and program instructions stored in the data storage and executable by the processing unit to carry out various functions to control handoff of a UE. In particular, the functions may include, during handoff of the UE from a first wireless network to a second wireless network, (i) receiving via the network communication interface from the first wireless network an identifier of the first wireless network, and (ii) storing the received identifier. Further, the functions may include, while the UE is being served by the second wireless network as a result of the handoff from the first wireless network, detecting a trigger for handoff of the UE from the second wireless network, and responsive to detecting the trigger, (i) retrieving the stored identifier of the first wireless network and (ii) transmitting the retrieved identifier to the UE in a directive for the UE to hand off to the first wireless network having that identifier.

In practice, the identifier of the first wireless network may be a PLMN ID. Further, the first wireless network may regularly broadcast the identifier of the first wireless network. Thus, the act of the second wireless network transmitting the identifier of the first wireless network to the UE may cause the UE to scan for broadcast of that identifier and, upon detecting broadcast of that identifier, to hand off back to the first wireless network.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

The present method and corresponding system will be described by way of example in a scenario where a UE is served by a particular 4G LTE network, the UE then hands off from that 4G LTE network to a 3G CDMA network, and the UE is then going to hand off from that 3G CDMA network to 4G LTE coverage once again. In accordance with the present disclosure, the 3G CDMA network in that scenario may provide the UE with the identifier of the previously serving 4G LTE network, so as to cause the UE to scan for and ultimately hand back to that particular 4G LTE network rather than to another 4G LTE network.

Those of ordinary skill in the art should appreciate, however, that the present disclosure can extend to apply in other scenarios as well, such as with respect to handoff between other air interface protocols or even with respect to handoff between networks operating on the same air interface protocol.

Further, it should be understood that the arrangements described herein are provided as example only, and that other arrangements and other elements (e.g., machines, interfaces, functions, orders of functions, etc.) can be used instead and some elements may be omitted altogether. In addition, those of ordinary skill in the art will appreciate that many of the elements described herein are functional entities that may be implemented as discrete components or in conjunction with other components, in any suitable combination and location, and may be implemented at least in part by one or more computer processors executing program instructions stored in a non-transitory computer readable medium.

Figure 1:
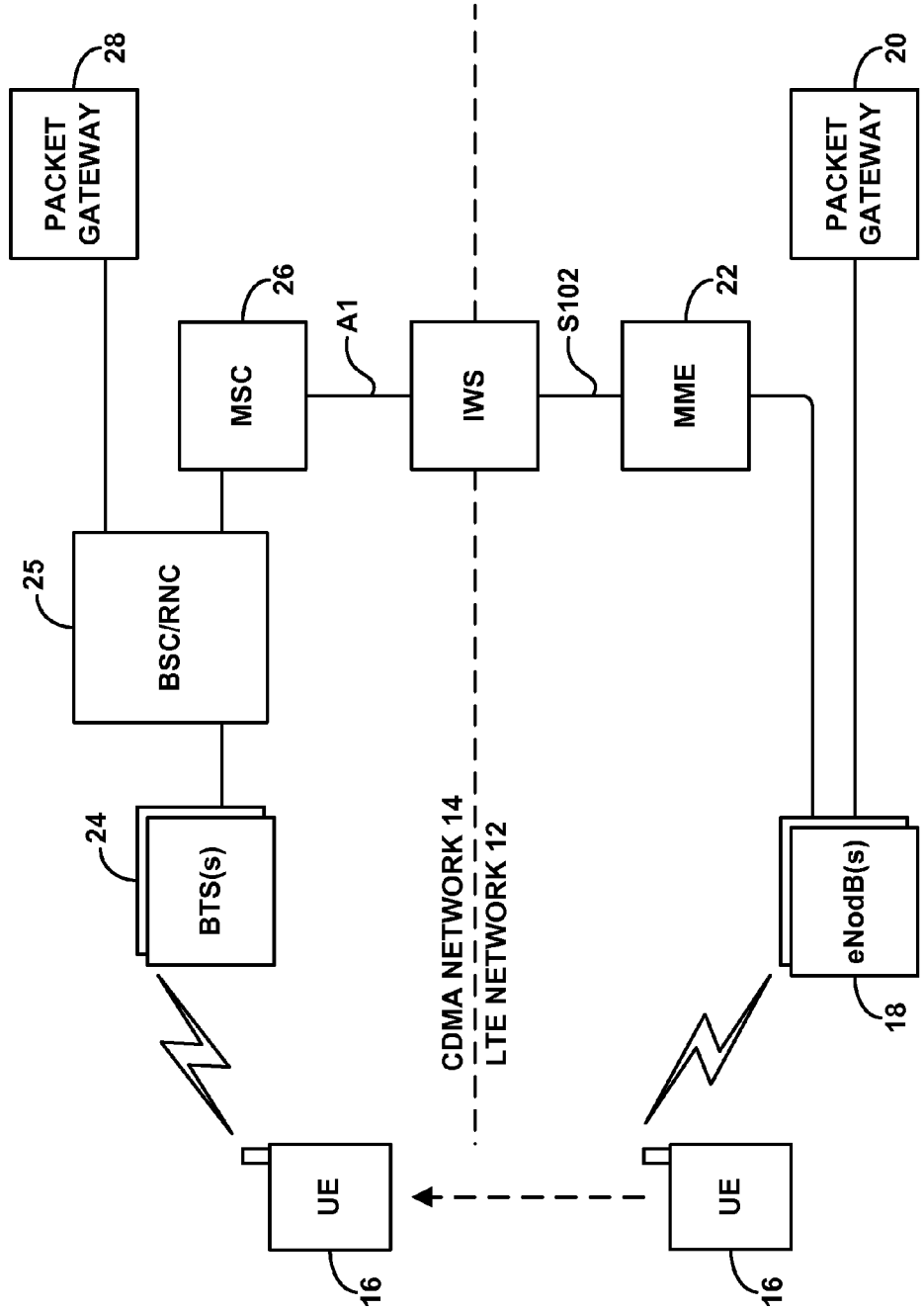
FIG. 1 is a simplified block diagram of an example network arrangement in which the present method can be implemented.

Referring to the drawings, FIG. 1 is a simplified block diagram of an example arrangement including a 4G LTE network 12 and a 3G CDMA network 14, and showing a representative UE 16 moving between being served by the 4G LTE network and being served by the 3G CDMA network.

As shown, the 4G LTE network includes one or more base stations 18 known as eNodeBs, each of which includes an antenna arrangement and associated equipment for radiating to define one or more LTE coverage areas in which UEs such as UE 16 can operate. These eNodeBs may include "macro" base stations of the type typically provided on towers and arranged to serve wide public areas. Further, the eNodeBs may include "pico" or "femto" base stations of the type typically provided to serve smaller areas such as particular buildings or urban areas.

As further shown, the eNodeBs 18 are coupled with a packet gateway 20, which may provide connectivity with a transport network such as the Internet for instance, so as to enable UEs that are served by the eNodeBs to engage in communication on the transport network. In addition, the eNodeBs are coupled with a mobility management entity (MME) 22, which functions as a signaling and call control server for the 4G LTE network, such as to manage registration and paging of UEs and signaling to set up bearer paths with gateway 20 for UE communication.

The 3G CDMA network, on the other hand, is shown including one or more base stations 24 known as base transceiver stations (BTSs) (or access nodes (ANs)), each of which likewise includes an antenna arrangement and associated equipment for radiating to define one or more CDMA coverage areas in which UEs such as UE 16 can operate. As with the eNodeBs of network 12, these BTSs may include macro, pico, and femto base stations. Further, in certain implementations, some cell towers or other units may house both an LTE eNodeB and a 3G BTS.

Various 3G BTSs in network 14 may be coupled with or have an integrated base station controller (BSC) or radio network controller (RNC) function (not shown), which may control aspects of base station operation. Further the BTSs may be integrated with or coupled directly or through one or more entities such a BSC/RNC 25 with a mobile switching center (MSC) 26 or the like, which may provide connectivity with a transport network such as the PSTN for instance, and a packet gateway 28, which may provide connectivity with a transport network such as the Internet for instance. Further, the MSC 26 may function generally as a signaling and call control function for the 3G CDMA network, such as to manage registration and paging of UEs and signaling to set up bearer communications for UEs.

Further shown sitting as a node coupled with both the MME 22 of network 12 (via an S102 link) and the MSC 26 of network 14 (via an A1 link) is an interworking server (IWS) 28, which may function as a signaling intermediary between the two networks. In practice, the IWS 28 may pass signaling messages between MME 22 and MSC 26, to facilitate functions such as handoff of a UE between the two networks. For instance, the IWS may function to allow 3G CDMA signaling to pass between the MSC 26 of network 14 and a UE that is operating in LTE coverage of network 12, through encapsulation of such messages in LTE user-plane headers transmitted between the IWS and the UE (via a serving eNodeB, the MME, and the S102 link). Such an arrangement can facilitate efficient handoff of a UE from LTE to CDMA.

By way of example, while a UE is served by an eNodeB of network 12, the UE may regularly provide radio measurement reports to the eNodeB as discussed above. Once the eNodeB determines that the UE's reported LTE signal strength is threshold low, eNodeB may then transmit to the UE information about 3G CDMA network 14, to enable the UE to scan for possible CDMA coverage. For instance, the eNodeB may transmit such information in an LTE system information block (SIB) such as SIB8. Upon scanning for CDMA coverage, the UE may then detect a threshold strong CDMA pilot signal from a CDMA BTS and may seek handoff to that CDMA coverage area. In particular, the UE may generate a CDMA origination message or handoff request message (or other such message) and encapsulate it in LTE user-plane header data and transmit the resulting message to the eNodeB, the eNodeB may then transmit the message to the MME, and the MME may transmit the message via the S102 link to the IWS. The IWS may then strip the LTE header data to uncover the underlying origination or handoff request message and pass the message along to the MSC.

Upon receipt of the origination or handoff request message, the MSC (possibly in conjunction with a BSC or the like) may then arrange for the BTS to assign a traffic channel or other CDMA connection resource for the UE, and the MSC may transmit to the IWS a handoff directive that provides a CDMA traffic channel assignment for the UE. The IWS may then encapsulate that handoff directive in LTE user-plane header data and transmit the resulting message via the S102 link to the MME, the MME may transmit the message to the eNodeB, and the eNodeB may transmit the message over the LTE air interface to the UE. The UE may then strip the LTE header data to uncover the underlying handoff directive and, in response to the directive, may transition to operate the assigned CDMA traffic channel.

Through this or another process, a UE that is actively engaged in LTE communication via network 12 may thus conveniently hand off to instead engage in CDMA communication via network 14.

At some point thereafter, while the UE is being served by network 14, the UE may then have reason to begin scanning for LTE coverage once again, for possible handoff from CDMA back to LTE. This may occur for various reasons. For instance, while being served by network 14, the UE may regularly provide its serving BTS with radio measurement reports, such as power strength measurement messages (PSMMs) or data rate control (DRC) messages, indicating the CDMA signal strength (e.g., signal to noise ratio) that the UE is receiving from various CDMA coverage areas. When that signal strength drops to a threshold low level, the serving BTS may then transmit to the UE a directive for the UE to begin scanning for LTE coverage and to report to the BTS any detected LTE coverage. Alternatively, the UE may be arranged to regularly scan for LTE coverage and, upon detecting sufficient signal strength, to report the detected LTE coverage to the BTS. Upon receipt of the UE's reports of detected LTE coverage, the BTS may pass the reports to the MSC for processing.

Assuming that the UE reports strong enough coverage from a particular LTE network, the MSC may then engage in signaling with that LTE network (e.g., via an IWS) to arrange for handoff of the UE to that LTE network. Further, the MSC may transmit to the UE, via the BTS, a handoff direction message directing the UE to hand off to that LTE network. The UE may then proceed as directed, transitioning from engaging CDMA communication back to engaging in LTE communication.

Figure 2:
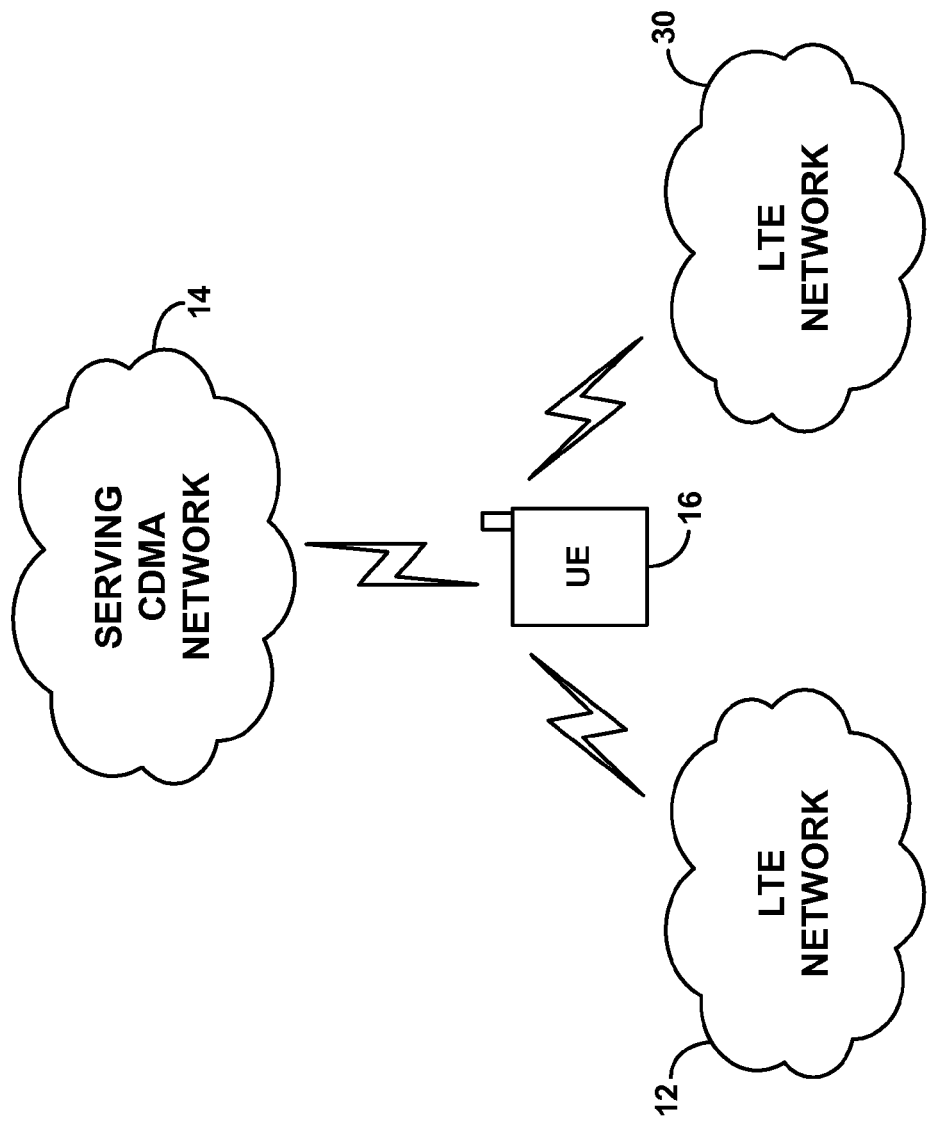
FIG. 2 is a simplified block diagram of an example arrangement in which a UE that was handed off from a first wireless network to a second wireless network may then hand off to a third wireless network or back to the first wireless network.

As discussed above, an issue can arise in this process if there are multiple LTE networks to which the UE can hand off from CDMA network 14. One of those LTE networks may be network 12 that earlier served the UE, but one or more other LTE networks may exist in the area as well. FIG. 2 illustrates an example of such an arrangement, where the UE is currently served by CDMA network 14 as a result of handoff to CDMA network 14 from LTE network 12, but where there are two LTE networks 12, 30 covering the UE's current location. In this arrangement, LTE network 30 may be operated by a different wireless service provider than that operating LTE network 12, and LTE network 30 may provide different quality of service than LTE network 12. In this situation, there is a chance that the UE might hand off from CDMA network 14 to LTE network 30 rather than back to LTE network 12, and that the UE may receive noticeably different quality of service than it received when it was earlier served by LTE network 12.

The present method may help to overcome this issue, by conveying to network 14 an identifier of network 12 so that network 14 can then direct the UE to hand off specifically back to network 12 rather than to some other LTE network such as LTE network 30. In particular, while the UE is being served by network 12 and is going to hand off from network 12 to network 14, network 12 may provide to network 14 an identifier of network 12 as the network that is currently serving the UE, and network 14 may store that received identifier. Thereafter, when network 14 is serving the UE and detects a trigger for handoff of the UE from network 14, network 14 may retrieve and transmit the identifier of network 12 to the UE so as to cause the UE to hand off specifically back to network 12 rather than to another network such a LTE network 30.

Figure 3:
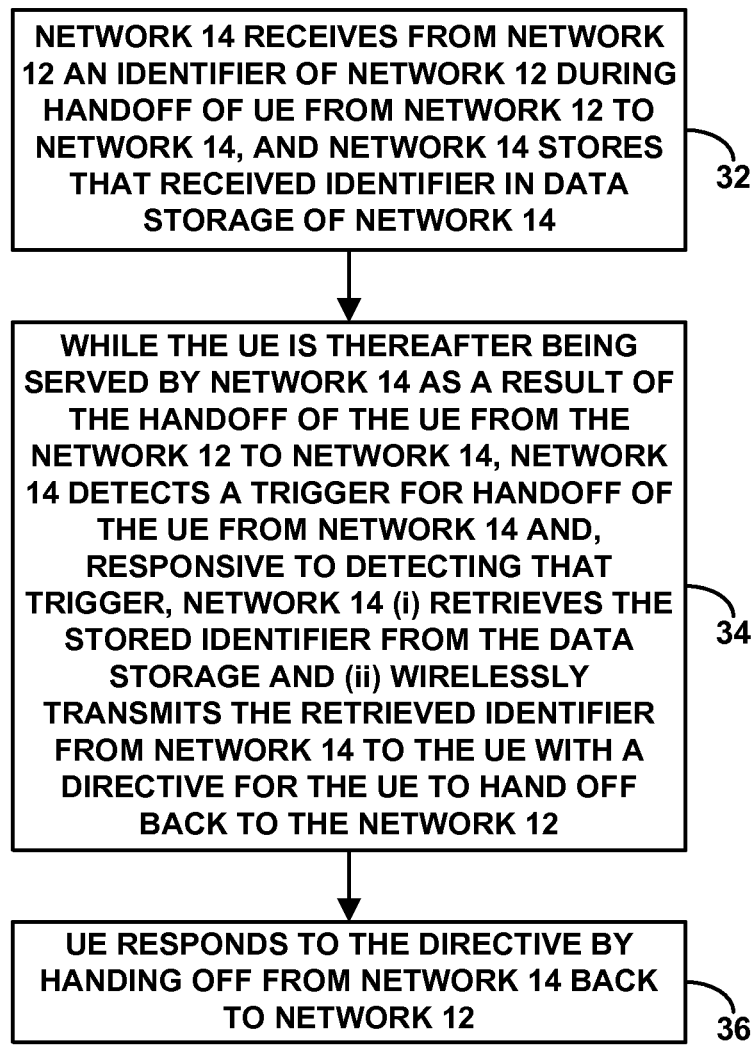
FIG. 3 is a flow chart depicting functions that can be carried out in accordance with an example implementation of the method.

FIG. 3 is a flow chart depicting representative functions of this method by way of example. In practice, these functions may be carried out by network 14, and particularly by one or more network entities such as MSC 26 for instance.

As shown in FIG. 3, at block 32, the method involves network 14 receiving from network 12 an identifier of network 12 during handoff of the UE from network 12 to network 14, and network 14 storing that received identifier in data storage of network 14. Further, at block 34, the method then involves, while the UE is thereafter being served by network 14 as a result of the handoff of the UE from the network 12 to network 14, network 14 detecting a trigger for handoff of the UE from network 14 and, responsive to detecting that trigger, network 14 (i) retrieving the stored identifier from the data storage and (ii) wirelessly transmitting the retrieved identifier from network 14 to the UE with (e.g., in) a directive for the UE to hand off back to the network 12. At block 36, the UE then responds to that directive by handing off from network 14 back to network 12.

In an example implementation of this method, as noted above, the identifier of network 12 could be a PLMN ID or other identifier that network 12 regularly broadcasts in an overhead message. That way, when network 14 provides that identifier to the UE in response to detecting the trigger for handoff of the UE from network 14, the UE may begin to scan for broadcast of that particular identifier and, upon detecting broadcast of the identifier from an eNodeB of network 12, may then hand off to that eNodeB and thus to network 12.

In practice, the act of network 14 receiving the identifier of network 12 during hand off of the UE from network 12 to network 14 can be carried out in various ways. As one example, when the UE communicates with the IWS through user-plane encapsulation as discussed above (via the eNodeB, the MME, and the S102 link), the UE could programmatically include in its origination or handoff request message, or other signaling message, the identifier of network 12 that is currently serving the UE (which the UE could determine by reading the identifier from an overhead message broadcast by its serving network for instance). That way, the identifier would be passed from network 12 to network 14 as the MME of network 12 transmits the encapsulated message to the IWS and the IWS passes the underlying message to the MSC of network 14.

As another example, if the MME engages in any signaling communication with the MSC in relation to the handoff of the UE from network 12 to network 14, the MME may programmatically provide the identifier of network 12 to the MSC during the course of that signaling communication (e.g., within a message provided for another purpose, or in another message specifically for this purpose). And as still another example, as one or more signaling messages related to the handoff of the UE from network 12 to network 14 flow via the IWS, the IWS may programmatically provide the MSC with an identifier of network 12, such as by adding the identifier of network 12 into one or more such signaling messages. And as still another example, the identifier of network 12 could be provided within an existing message communicated from network 12 to network 14 for still some other purpose. Yet other examples are possible as well, involving these and/or other entities (including, for instance, one or more entities of network 14 than the MSC).

Once network 14 receives the identifier of network 12, network 14 may then store the received identifier for later reference. By way of example, a network entity such as MSC 26 or any other entity of network 14 may receive and store the identifier in data storage of the network entity or in external data storage accessible by the network entity and/or by one or more other network entities. For instance, if the MSC establishes, maintains, or receives a service profile record for the UE that is handing off to network 14, the MSC may store the received identifier in that service profile record, as an indication of the network from which the UE is handing off and thus as an indication of the network to which network 14 should later direct the UE to hand back to when appropriate. Alternatively, the MSC or another entity of network 14 may store the identifier in some other manner for later reference.

Continuing with reference to FIG. 3, the act of detecting the trigger for handoff of the UE from network 14 while the UE is being served by network 14 may also take various forms. By way of example, while the UE is being served with CDMA service by network 14, the UE may regularly monitor the signal strength of its serving coverage area and of any other CDMA coverage areas extending to the UE's location and may regularly report the monitored signal strength to its serving BTS 24, and such reports may propagate to the MSC 26. If the MSC or another entity of network 14 determines that none of the CDMA coverage reported by the UE is threshold strong enough, the MSC may then determine that the UE should hand off from network 14 to another network that might be able to provide better coverage.

And as another example, if the UE has a preference for LTE or for any other reason scans for and detects the presence of one or more LTE coverage areas and reports that detected LTE coverage to network 14, the MSC or another entity of network 14 may deem that to indicate that the UE should hand off from network 14 to one of the detected LTE coverage areas. Still other examples of detecting or encountering the trigger for handoff of the UE from network 14 could exist as well.

In turn, the act of responding to detecting the trigger by retrieving the stored identifier from the data storage and wirelessly transmitting the retrieved identifier from network 14 to the UE with the directive for the UE to hand off back to network 12, and the UE responsively handing off back to network 12, may also take various forms.

By way of example, in a scenario where the UE has reported threshold low CDMA signal strength, the MSC or another of network 14 may responsively retrieve the stored identifier of network 12 from the data storage and transmit the network identifier in a scanning directive to the UE, to direct the UE to begin scanning for LTE coverage broadcasting the provided network identifier. Such a scanning directive may also provide the UE with an indication of one or more carrier frequencies used by network 12 so that the UE may scan on one or more appropriate frequencies in search of any coverage area broadcasting the provided network identifier. In response to that scanning directive, the UE may then scan accordingly. And upon detecting an LTE coverage area that broadcasts the provided network identifier, the UE may report that detected coverage area to network 14. In turn, upon receipt of that report, network 14 may then send a handoff direction message to the UE to direct the UE to hand off to that coverage area, i.e., back to network 12, and the UE may do so.

Likewise, in a scenario where network 14 has received from the UE a report of one or more LTE coverage areas detected by the UE, such a report may include the network identifier being broadcast in each detected LTE coverage area. Upon receipt of such a report, network 14 may then determine that the stored identifier of network 12 matches the identifier being broadcast in at least one such reported LTE coverage area. And in response to finding such a match, network 14 may then transmit to the UE a handoff direction message directing the UE to hand off to that particular LTE coverage area, i.e., to hand off to network 12, and the UE may do so.

In these or other scenarios, when the UE scans for LTE coverage, the UE may scan for reference signals broadcast by one or more LTE eNodeBs. Upon detecting such a reference signal of sufficient strength in a particular coverage area, the UE may then read one more overhead messages broadcast in the coverage area to determine the network identifier of the coverage area, such as a PLMN ID for instance. The UE may then report that network identifier, and perhaps other data regarding the detected LTE coverage area, to its serving network.

Figure 4:
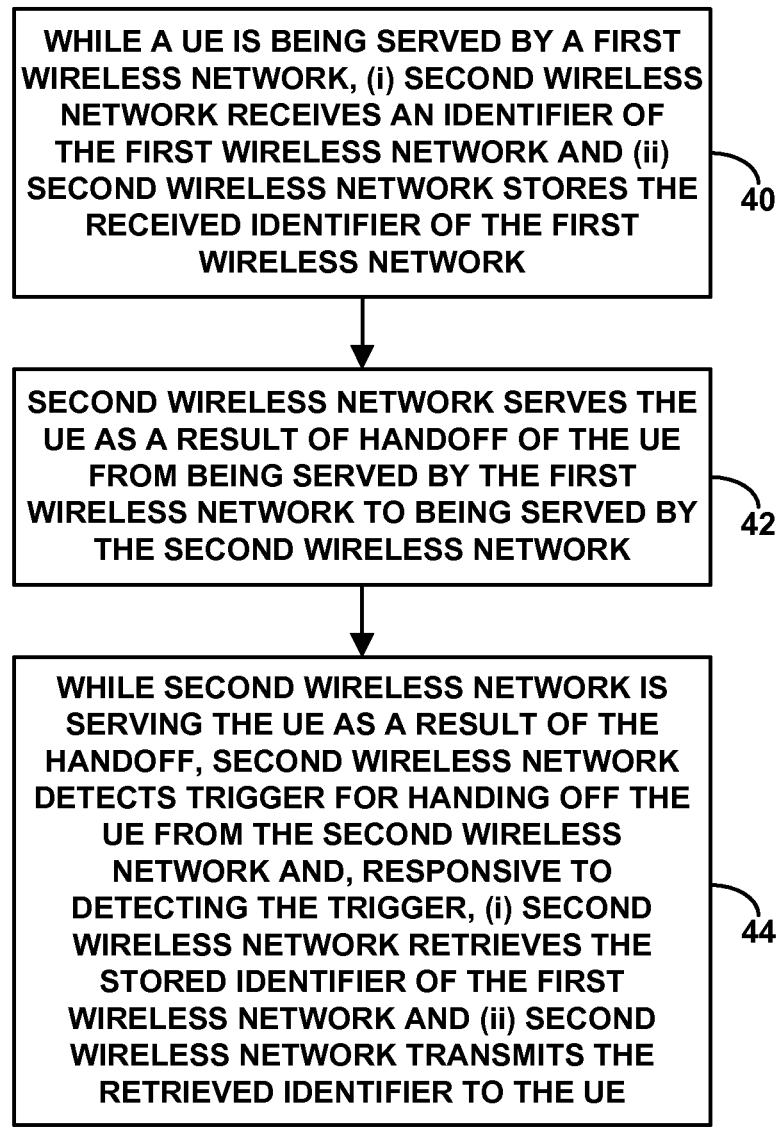
FIG. 4 is another flow chart depicting functions that can be carried out in accordance with an example implementation of the method.

Referring next to FIG. 4, another flow chart is provided to illustrate another characterization of functions that can be carried out in accordance with the present method, again by an MSC or one or more other network entities for instance.

As shown in FIG. 4, at block 40, the method may involve, while a UE is being served by a first wireless network, (i) receiving into a second wireless network an identifier of the first wireless network and (ii) the second wireless network storing the received identifier of the first wireless network. In turn, the method may then involve, at block 42, the second wireless network serving the UE as a result of handoff of the UE from being served by the first wireless network to being served by the second wireless network. And the network may then involve, at block 44, while the second wireless network is serving the UE as a result of the handoff, the second wireless network detecting a trigger for handing off the UE from the second wireless network and, responsive to detecting the trigger, (i) the second wireless network retrieving the stored identifier of the first wireless network and (ii) the second wireless network transmitting the retrieved identifier to the UE.

In this implementation, the act of the second wireless network receiving the identifier of the first wireless network may involve the second network receiving the identifier from the first wireless network. For instance, the second wireless network may receive the identifier in a request that the second wireless network receives from the first wireless network, requesting the second wireless network to assign an air interface traffic channel for handoff of the UE from the first wireless network to the second wireless network. Such a request may be an origination request or handoff request message as discussed above, or may take other forms. Alternatively, the second wireless network may receive the identifier from one or more other entities, whether through or from the first wireless network or not.

In line with the discussion above, the first wireless network may serve the UE through air interface communication using a first air interface protocol and the second wireless network serves the UE through air interface communication using a second air interface protocol different than the first air interface protocol. For instance, the first air interface protocol may be LTE, and the second air interface protocol may be CDMA (e.g., 1xRTT and/or EV-DO).

Further, an S102 link may communicatively link an MME of the first wireless network with an interworking server that is in communication with an MSC of the second wireless network, in which case the act of receiving into the second wireless network from the first wireless network the identifier of the first wireless network may involve the second wireless network receiving the identifier conveyed via the S102 link. Moreover, the MSC or other entity of the second wireless network may store and retrieve the received identifier and may transmit the retrieved identifier directly or indirectly to a BTS of the second wireless network, and the BTS may then transmit the identifier over an air interface to the UE.

Moreover, in line with the discussion above, the identifier of the first wireless network may be a PLMN ID or may take other forms, and the first wireless network may broadcast the identifier. The act of the second wireless network transmitting the retrieved identifier to the UE may then comprise sending a handoff direction message to the UE, and may cause the UE to scan for broadcast of the identifier and, upon detecting broadcast of the identifier, to hand off from the second wireless network to the first wireless network. Further, the second wireless network may transmit the identifier to the UE in response to detecting the handoff trigger in various ways as discussed above, such as upon detecting that the UE is reporting threshold low forward-link signals quality for instance.

Figure 5:
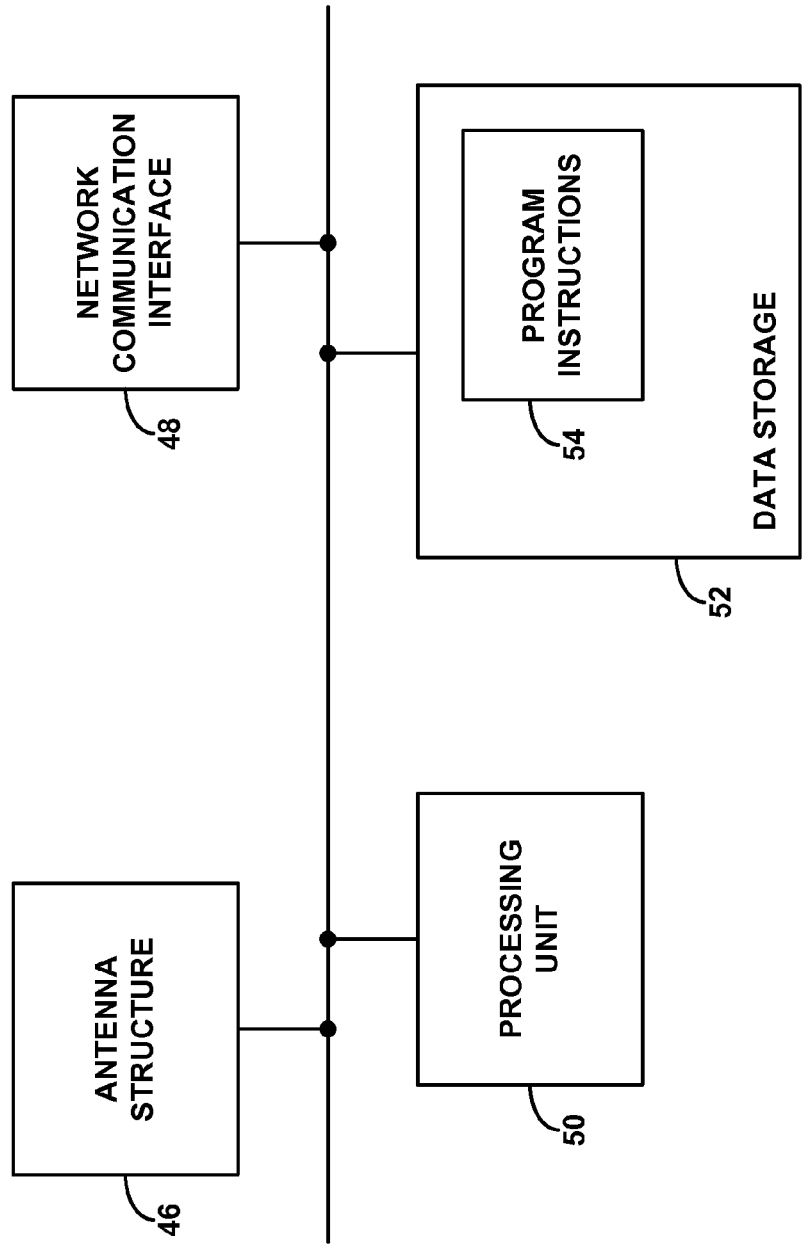
FIG. 5 is a simplified block diagram showing example components of a network that could be arranged to implement the method.

Finally, FIG. 5 is a simplified block diagram depicting functional components of network 14 that may carry out aspects of the present method. As shown, the network includes an antenna structure 46, as part of a base station for instance, for engaging in air interface communication with served UEs. Further, the network includes a network communication interface 48, as part of MSC 26 for instance, for communicating with IWS 28, so as to thereby receive an identifier of network 12 while a UE is being served by network 12 and perhaps while the UE is being handed off from network 12 to network 14. The network then further includes a processing unit 50 (such as one or more general purpose processors and/or one or more special purpose processors), as well as non-transitory data storage 52, which may be integrated in whole or in part with processing unit 50. Processing unit 50 and data storage 52 may be part of MSC 26 or one or more other components of network 14.

Data storage 52 may function to hold the received identifier of network 12 for later reference to facilitate directing the UE to hand off back to network 12 that earlier served the UE. Further, as shown, the data storage may hold program instructions 54 executable by the processing unit 50 to carry out various functions described herein. For instance, these functions may include, during handoff of a UE from network 12 to a network 14, (i) receiving via the network communication interface from network 12 an identifier of network 12, and (ii) storing the received identifier. Further, the functions may include, while the UE is being served by network 14 as a result of the handoff from network 12, detecting a trigger for handoff of the UE from network 14, and responsive to detecting the trigger, (i) retrieving the stored identifier of network 12 and (ii) transmitting the retrieved identifier to the UE in a directive for the UE to hand off to the network having that identifier, i.e., to network 12.

As discussed above, the act of receiving the identifier during handoff of the UE from network 12 to network 14 may include receiving the identifier with a handoff request wirelessly transmitted by the UE to network 12 and passed then from network 12 to network 14. Further, network 12 may be an LTE network, and network 14 may be a CDMA network, and receiving the identifier during the handoff of the UE from network 12 to network 14 may involve receiving the identifier conveyed over an S102 link from network 12 to network 14. And the identifier may be a PLMN ID that is wirelessly broadcast in an air interface control message by network 12.

Exemplary embodiments have been described above. Those skilled in the art will appreciate, however, that changes may be made from the described embodiments without departing from the intended scope.

What is claimed is:

1. A method comprising:
   during handoff of a user equipment device (UE) from a first wireless network to a second wireless network, receiving into the second wireless network from the first wireless network an identifier of the first wireless network, and storing the received identifier in data storage of the second wireless network; and
   thereafter, while the UE is being served by the second wireless network as a result of the handoff of the UE from the first wireless network to the second wireless network, detecting a trigger for handoff of the UE from the second wireless network and, responsive to the detecting, (i) retrieving the stored identifier from the data storage and (ii) wirelessly transmitting the retrieved identifier from the second wireless network to the UE with a directive for the UE to hand off back to the first wireless network,
   wherein a link communicatively links a mobility management entity of the first wireless network and an interworking server that is in communication with a mobile switching center of the second wireless network, and wherein receiving into the second wireless network from the first wireless network the identifier of the first wireless network comprises receiving the identifier conveyed via the link.

2. The method of claim 1, wherein receiving the identifier during handoff of the UE from the first wireless network to the second wireless network comprises receiving the identifier with a handoff request wirelessly transmitted by the UE to the first wireless network and passed then from the first wireless network to the second wireless network.

3. The method of claim 2, wherein the handoff request comprises an origination request.

4. The method of claim 2,
   wherein the first wireless network comprises a Long Term Evolution (LTE) network, the second wireless network comprises a Code Division Multiple Access (CDMA) network, and the link comprises an S102 signaling link and
   wherein the receiving the identifier during the handoff of the UE from the first wireless network to the second wireless network comprises receiving the identifier conveyed via the S102 signaling link.

5. The method of claim 1, wherein the identifier comprises a public land mobile network identifier that is also wirelessly broadcast in an air interface control message by the first wireless network.

6. A method comprising:
   while a UE is being served by a first wireless network, (i) receiving into a second wireless network an identifier of the first wireless network and (ii) storing, by the second wireless network, the received identifier of the first wireless network;
   serving the UE, by the second wireless network, as a result of handoff of the UE from being served by the first wireless network to being served by the second wireless network; and
   while the second wireless network is serving the UE as a result of the handoff, detecting by the second wireless network a trigger for handing off the UE from the second wireless network and, responsive to the detecting, (i) retrieving, by the second wireless network, the stored identifier of the first wireless network and (ii) transmitting the retrieved identifier from the second wireless network to the UE,
   wherein a link communicatively links a mobility management entity of the first wireless network and an interworking server that is in communication with a mobile switching center of the second wireless network, and wherein receiving into the second wireless network the identifier of the first wireless network comprises receiving the identifier conveyed via the link.

7. The method of claim 6, wherein receiving into the second wireless network the identifier of the first wireless network comprises receiving into the second wireless network from the first wireless network the identifier of the first wireless network.

8. The method of claim 7, further comprising receiving into the second wireless network from the first wireless network a request for the second wireless network to assign an air interface traffic channel for the handoff of the UE from being served by the first wireless network to being served by the second wireless network,
   wherein receiving into the second wireless network from the first wireless network the identifier of the first wireless network comprises receiving the identifier within the request.

9. The method of claim 6, wherein the first wireless network serves the UE through air interface communication using a first air interface protocol and the second wireless network serves the UE through air interface communication using a second air interface protocol different than the first air interface protocol.

10. The method of claim 9, wherein the first air interface protocol is Long Term Evolution (LTE), and the second air interface protocol is Code Division Multiple Access (CDMA).

11. The method of claim 10, wherein the link comprises an S102 signaling link.

12. The method of claim 11,
wherein storing the received identifier comprises the mobile switching center storing the received identifier,
wherein retrieving the stored identifier comprises the mobile switching center retrieving the stored identifier, and
wherein transmitting the retrieved identifier from the second wireless network to the UE comprises the mobile switching center passing the transmitting identifier to a base transceiver station of the second wireless network, and the base transceiver station transmitting the identifier over an air interface to the UE.

13. The method of claim 6, wherein the identifier of the first wireless network comprises a public land mobile network identifier (PLMN ID) of the first wireless network, wherein the first wireless network broadcasts the PLMN ID, and wherein transmitting the retrieved identifier from the second wireless network to the UE causes the UE to scan for broadcast of the PLMN identifier and, upon detecting broadcast of the PLMN identifier, to hand off from the second wireless network to the first wireless network.

14. The method of claim 6, wherein detecting the trigger for handing off the UE from the second wireless network comprises receiving from the UE a report of forward-link signal quality, and determining that the reported forward-link signal quality is below a threshold level.

15. The method of claim 6, wherein transmitting the retrieved identifier from the second wireless network to the UE comprises transmitting the retrieved identifier in a handoff direction message over an air interface from the second wireless network to the UE.

16. The method of claim 15, further comprising broadcasting over an air interface from the first wireless network the identifier, wherein the handoff direction message causes the UE to scan for the broadcast identifier and, upon detecting broadcast of the identifier, to then hand off from the second wireless network to the first wireless network.

17. A handoff control system comprising:
a network communication interface;
a processing unit;
data storage; and
program instructions stored in the data storage and executable by the processing unit to carry out functions comprising:
(a) during handoff of a UE from a first wireless network to a second wireless network, (i) receiving via the network communication interface from the first wireless network an identifier of the first wireless network, and (ii) storing the received identifier, and
(b) while the UE is being served by the second wireless network as a result of the handoff from the first wireless network, detecting a trigger for handoff of the UE from the second wireless network, and responsive to detecting the trigger, (i) retrieving the stored identifier of the first wireless network and (ii) transmitting the retrieved identifier to the UE in a directive for the UE to hand off to the first wireless network having that identifier,
wherein a link communicatively links a mobility management entity of the first wireless network and an interworking server that is in communication with a mobile switching center of the second wireless network, and wherein receiving from the first wireless network the identifier of the first wireless network comprises receiving the identifier conveyed via the link.

18. The handoff control system of claim 17, wherein receiving the identifier during handoff of the UE from the first wireless network to the second wireless network comprises receiving the identifier with a handoff request wirelessly transmitted by the UE to the first wireless network and passed then from the first wireless network to the second wireless network.

19. The handoff control system of claim 17,
wherein the first wireless network comprises a Long Term Evolution (LTE) network, the second wireless network comprises a Code Division Multiple Access (CDMA) network, and the link comprises an S102 signaling link and
wherein the receiving the identifier during the handoff of the UE from the first wireless network to the second wireless network comprises receiving the identifier conveyed via the S102 signaling link.

20. The handoff control system of claim 17, wherein the identifier comprises a public land mobile network identifier that is wirelessly broadcast in an air interface control message by the first wireless network.

* * * * *